US011375503B2

(12) United States Patent
Wu et al.

(10) Patent No.: US 11,375,503 B2
(45) Date of Patent: Jun. 28, 2022

(54) SIDE LINK COMMUNICATIONS WITH SLOT AGGREGATION

(71) Applicant: QUALCOMM Incorporated, San Diego, CA (US)

(72) Inventors: Shuanshuan Wu, San Diego, CA (US); Kapil Gulati, Hillsborough, NJ (US); Arjun Bharadwaj, Cupertino, CA (US); Sudhir Kumar Baghel, Hillsborough, NJ (US); Tien Viet Nguyen, Bridgewater, NJ (US); Shailesh Patil, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 16/809,168

(22) Filed: Mar. 4, 2020

(65) Prior Publication Data

US 2020/0305154 A1    Sep. 24, 2020

Related U.S. Application Data

(60) Provisional application No. 62/822,560, filed on Mar. 22, 2019.

(51) Int. Cl.
*H04W 72/04* (2009.01)
*H04L 5/00* (2006.01)
*H04W 28/02* (2009.01)

(52) U.S. Cl.
CPC ....... *H04W 72/0446* (2013.01); *H04L 5/0048* (2013.01); *H04W 28/0273* (2013.01); *H04W 28/0289* (2013.01); *H04W 72/0406* (2013.01)

(58) Field of Classification Search
CPC ......... H04W 28/0273; H04W 28/0289; H04W 72/04
See application file for complete search history.

(56) References Cited

U.S. PATENT DOCUMENTS 11,051,202 B2 *   6/2021   Davydov .......... H04W 28/0273
2018/0310300 A1 * 10/2018   Lin ....................... H04L 5/0053
(Continued)

FOREIGN PATENT DOCUMENTS

EP    3471304 A1    4/2019
EP    3606236 A1    2/2020
(Continued)

OTHER PUBLICATIONS

International Search Report and Written Opinion—PCT/US2020/021159—ISA/EPO—dated Mar. 27, 2020.

*Primary Examiner* — Raj Jain
(74) *Attorney, Agent, or Firm* — Patterson + Sheridan, LLP

(57) ABSTRACT

Certain aspects of the present disclosure are generally directed to an apparatus for wireless communication. The apparatus generally includes a processing system configured to determine a size of a transport block for a data channel based on a quantity of available resource elements of an allocation of resources for the transport block, the resources being allocated for transmission of data encoded in a plurality of slots of the data channel using slot aggregation, wherein the allocated resources in the plurality of slots have different quantities of available resource elements for the data, and generate the data channel in accordance with the determined size of the transport block, and an interface configured output the data channel for transmission.

30 Claims, 11 Drawing Sheets

(56) References Cited

U.S. PATENT DOCUMENTS

| | | | | |
|---|---|---|---|---|
| 2019/0132820 A1* | 5/2019 | Kimura | ................. | H03M 13/27 |
| 2020/0128438 A1* | 4/2020 | Wang | .................... | H04W 28/06 |
| 2020/0128529 A1* | 4/2020 | Wang | .................... | H04L 1/0016 |
| 2020/0305154 A1* | 9/2020 | Wu | ....................... | H04L 5/0048 |

FOREIGN PATENT DOCUMENTS

| | | | |
|---|---|---|---|
| WO | 2018174564 A1 | 9/2018 | |
| WO | 2018228212 A1 | 12/2018 | |

\* cited by examiner

SIDE LINK COMMUNICATIONS WITH SLOT AGGREGATION

CROSS-REFERENCE TO RELATED APPLICATIONS

This application claims benefit of U.S. Provisional Patent Application Ser. No. 62/822,560, filed Mar. 22, 2019, which is expressly incorporated herein by reference in its entirety.

BACKGROUND

Field of the Disclosure

Aspects of the present disclosure relate to wireless communications, and more particularly, to techniques for slot aggregation.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure are generally directed to an apparatus for wireless communication. The apparatus generally includes a processing system configured to determine a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data, and generate the data channel in accordance with the determined size of the transport block, and an interface configured output the data channel for transmission.

Certain aspects of the present disclosure are generally directed to an apparatus for wireless communication. The apparatus generally includes an interface configured obtain a data channel having control information and a transport block, a processing system configured to determine a size of a transport block based on the control information and a quantity of available resource elements of an allocation of resources for the transport block, the resources being allocated for transmission of data encoded in a plurality of slots of the data channel using slot aggregation, wherein the allocated resources in the plurality of slots have different quantities of available resource elements for the data, and decode the transport block in accordance with the determined size of the transport block.

Certain aspects of the present disclosure are generally directed to a method for wireless communication. The method generally includes determining a size of a transport block for a data channel based on a quantity of available resource elements of an allocation of resources for the transport block, the resources being allocated for transmission of data encoded in a plurality of slots of the data channel using slot aggregation, wherein the allocated resources in the plurality of slots have different quantities of available resource elements for the data, generating the data channel in accordance with the determined size of the transport block, and outputting the data channel for transmission.

Certain aspects of the present disclosure are generally directed to a method for wireless communication. The method generally includes obtaining a data channel having control information and a transport block, determining a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data, and decoding the transport block in accordance with the determined size of the transport block.

Certain aspects of the present disclosure are generally directed to an apparatus for wireless communication. The apparatus generally includes means for determining a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data, means for generating the data channel having the transport block in accordance with the determined size of the transport block, and means for outputting the data channel for transmission.

Certain aspects of the present disclosure are generally directed to an apparatus for wireless communication. The apparatus generally includes means for obtaining a data channel having control information and a transport block, means for determining a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data, and means for decoding the transport block in accordance with the determined size of the transport block.

Certain aspects of the present disclosure are generally directed to a computer-readable medium having instructions stored thereon to cause a processor to determine a size of a transport block for a data channel based on a quantity of available resource elements of an allocation of resources for the transport block, the resources being allocated for transmission of data encoded in a plurality of slots of the data channel using slot aggregation, wherein the allocated resources in the plurality of slots have different quantities of available resource elements for the data, generate the data channel in accordance with the determined size of the transport block, and output the data channel for transmission.

Certain aspects of the present disclosure are generally directed to a computer-readable medium having instructions stored thereon to cause a processor to obtain a data channel having control information and a transport block, determine a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data, and decode the transport block in accordance with the determined size of the transport block.

Certain aspects of the present disclosure are generally directed to a wireless node. The wireless node generally includes at least one antenna, a processing system configured to determine a size of a transport block for a data channel based on a quantity of available resource elements of an allocation of resources for the transport block, the resources being allocated for transmission of data encoded in a plurality of slots of the data channel using slot aggregation, wherein the allocated resources in the plurality of slots have different quantities of available resource elements for the data, and generate the data channel in accordance with the determined size of the transport block, and an interface configured output the data channel for transmission via the at least one antenna.

Certain aspects of the present disclosure are generally directed to a wireless node. The wireless node generally includes at least one antenna, an interface configured obtain a data channel having control information and a transport block via the at least one antenna, and a processing system configured to determine a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data, and decode the transport block in accordance with the determined size of the transport block.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
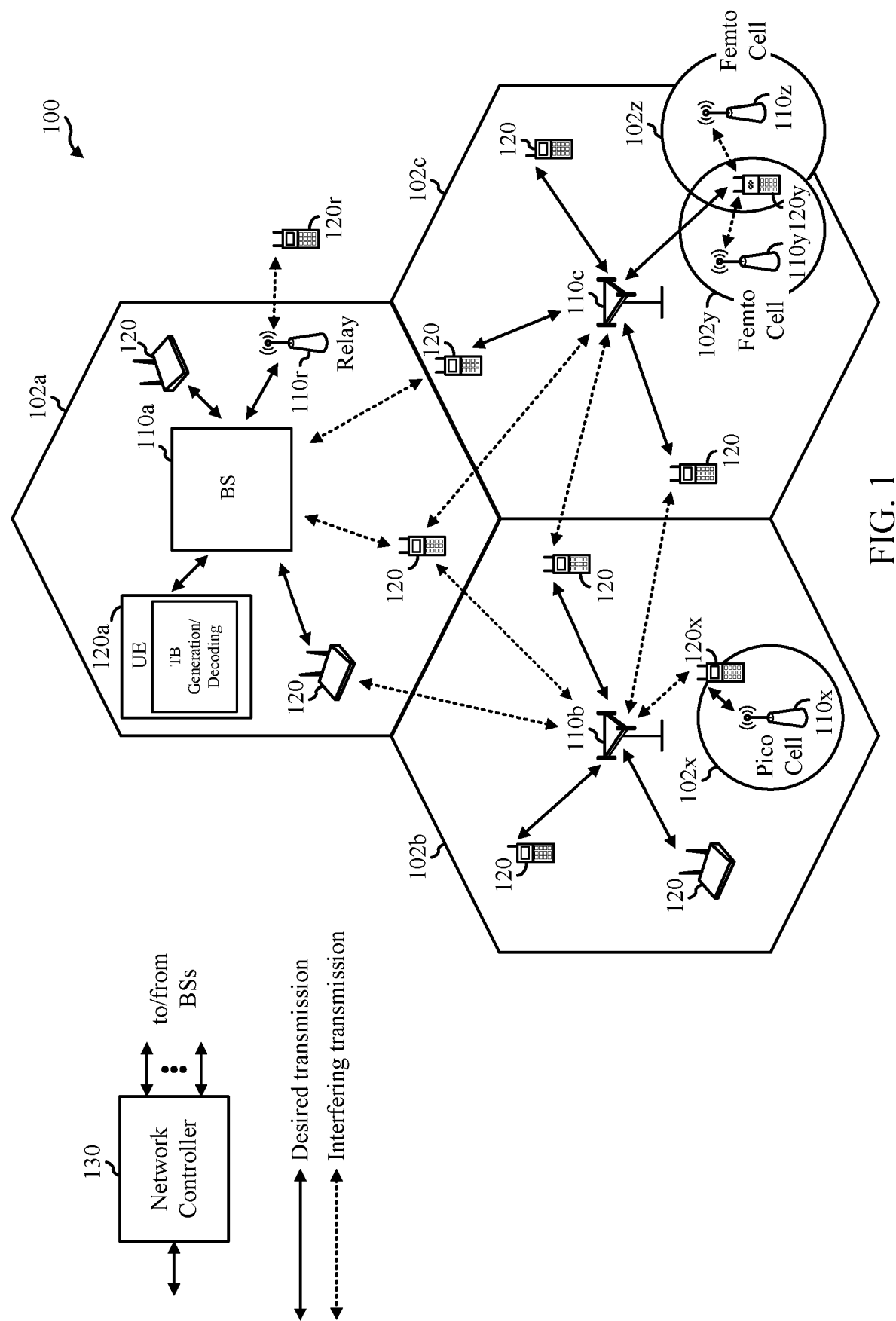
FIG. 1 is a block diagram conceptually illustrating an example telecommunications system, in accordance with certain aspects of the present disclosure.

Aspects of the present disclosure provide apparatus, methods, processing systems, and computer readable mediums for side link communication using slot aggregation across multiple slots of a transport block.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5G NR network). For example, as shown in FIG. 1, the UE 120a may include a transport block generation/decoding module that may be configured for generating and decoding of a transport block for side link communication using slot aggregation, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The techniques described herein may be incorporated into (such as implemented within or performed by) a variety of wired or wireless apparatuses (such as nodes or devices). In some implementations, a node includes a wireless node. Such a wireless node may provide, for example, connectivity to or for a network. In some implementations, a wireless node may be a BS or a UE.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC- FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
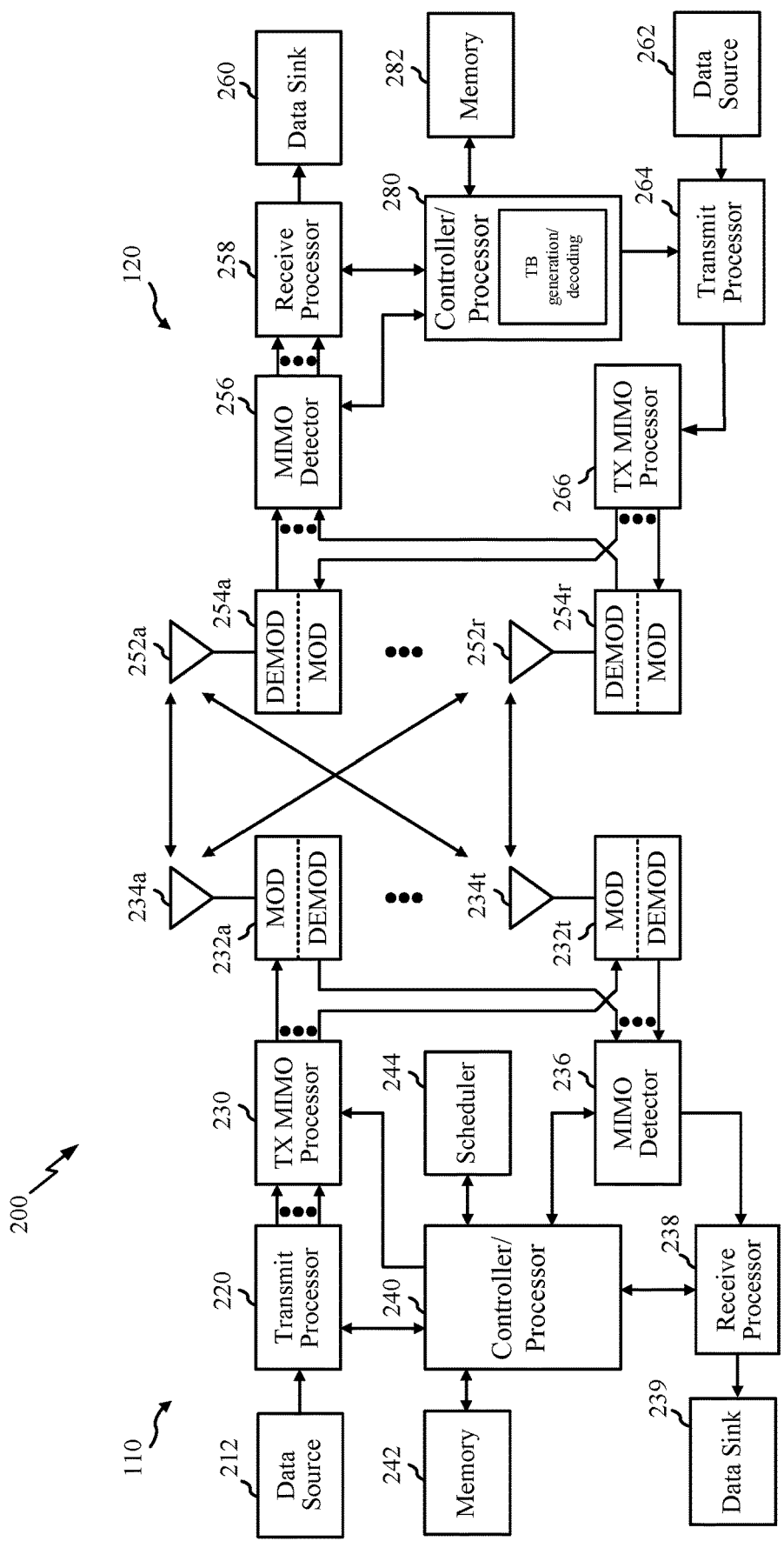
FIG. 2 is a block diagram illustrating an example architecture of a distributed radio access network (RAN), in accordance with certain aspects of the present disclosure.
Figure 4:
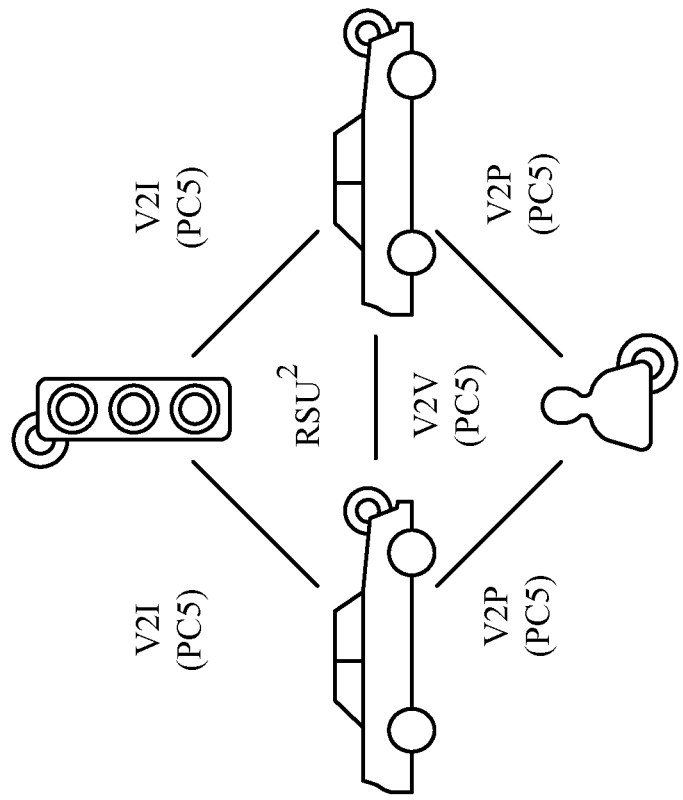

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 4, the controller/processor 280 of the UE 120 has a transport block generation/decoding module that may be configured for generating and decoding of a transport block for side link communication using slot aggregation, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a*-232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a*-232*t* may be transmitted via the antennas 234*a*-234*t*, respectively.

At the UE 120, the antennas 252*a*-252*r* may receive the downlink signals from the BS 110 and may provide received signals to the demodulators (DEMODs) in transceivers 254*a*-254*r*, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254*a*-254*r*, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
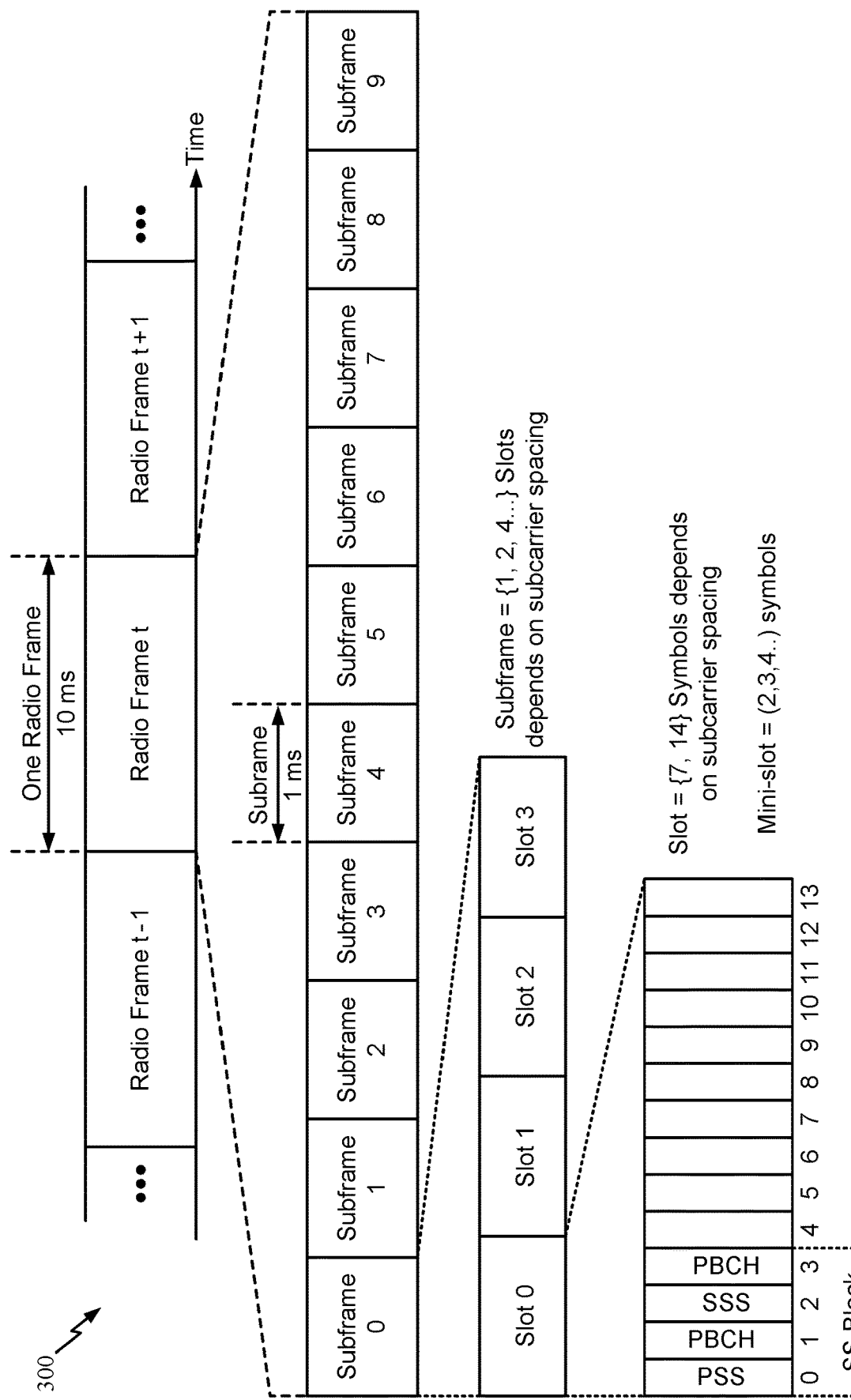
FIG. 3 is a diagram showing an example of a frame format. The transmission timeline for each of the downlink and uplink may be partitioned into units of radio frames.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a primary SS (PSS), a secondary SS (SSS), and a two symbol physical broadcast channel (PBCH). The SS block can be transmitted in a fixed slot location, such as the symbols 0-3 as shown in FIG. 3. The PSS and SSS may be used by UEs for cell search and acquisition. The PSS may provide half-frame timing, the SS may provide the cyclic prefix (CP) length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

Figure 5:
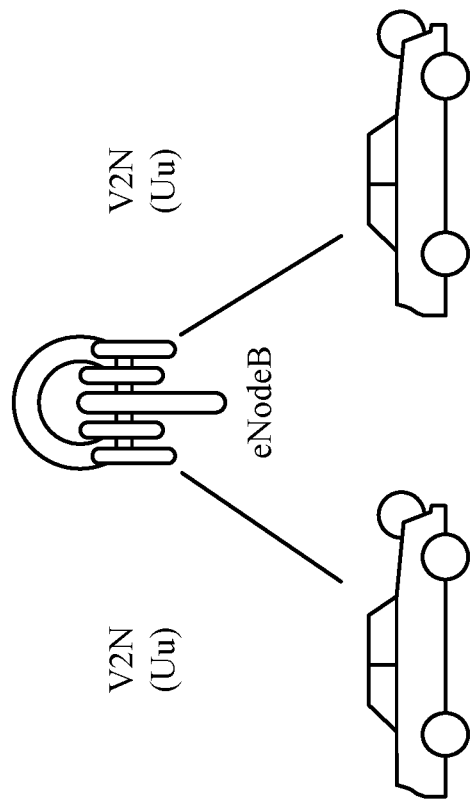
FIGS. 4 and 5 illustrate vehicle to everything (V2X) systems, in accordance with certain aspects of the present disclosure.

FIGS. 4 and 5 illustrate vehicle to everything (V2X) systems, in accordance with certain aspects of the present disclosure. Referring to FIG. 4, a V2X system is illustrated with two vehicles. The V2X system, provided in FIGS. 4 and 5 provides two complementary transmission modes. A first transmission mode involves direct communications (e.g., also referred to as a side link communications) between participants in the local area. Such communications are illustrated in FIG. 4. A second transmission mode involves network communications through a network as illustrated in FIG. 5, which may be implemented over a "Uu interface".

Referring to FIG. 4, the first transmission mode allows for direct communication between different participants in a given geographic location. As illustrated, a vehicle can have a communication with an individual (V2P) through a PC5 interface. Communications between a vehicle and another vehicle (V2V) may also occur through a PC5 interface. In a like manner, communication may occur from a vehicle to other highway components, such as a signal (V2I) through a PC5 interface. In each embodiment illustrated, two-way communication can take place between elements, therefore each element may be a transmitter and a receiver of information. In the configuration provided, the first transmission mode is a self-managed system and no network assistance is provided. Such transmission modes provide for reduced cost and increased reliability as network service interruptions do not occur during handover operations for moving vehicles. Resource assignments do not need coordination between operators and subscription to a network is not necessary, therefore there is reduced complexity for such self-managed systems.

The V2X system is configured to work in a 5.9 GHz spectrum, thus any vehicle with an equipped system may access this common frequency and share information. Such harmonized/common spectrum operations allows for safe operation. V2X operations may also co-exist with 802.11p operations by being placed on different channels, thus existing 802.11p operations will not be disturbed by the introduction of V2X systems. In one non-limiting embodiment, the V2X system may be operated in a 10 MHz band that describes/contains basic safety services. In other non-limiting embodiments, the V2X system may be operated over a wider frequency band of 70 MHz to support advanced safety services in addition to basic safety services described above.

Referring to FIG. 5, a second of two complementary transmission modes is illustrated. In the illustrated embodiment, a vehicle may communicate to another vehicle through network communications. These network communications may occur through discrete nodes, such as eNodeB, that send and receive information between vehicles.

The network communications may be used, for example, for long range communications between vehicles, such as noting the presence of an accident approximately 1 mile ahead. Other types of communication may be sent by the node to vehicles, such as traffic flow conditions, road hazard warnings, environmental/weather reports, service station availability and other like data. Data can be obtained from cloud-based sharing services.

For network communications, residential service units (RSUs) may be utilized as well as 4G/5G small cell communication technologies to benefit in more highly covered areas to allow real time information to be shared among V2X users. As the number of RSUs diminishes, the V2X systems may rely more on small cell communications, as necessary.

In either of the two complementary transmission modes, higher layers may be leveraged to tune congestion control parameters. In high density vehicle deployment areas, using higher layers for such functions provides an enhanced performance on lower layers due to congestion control for PHY/MAC.

The vehicle systems that use V2X technologies have significant advantages over 802.11p technologies. Conventional 802.11p technologies have limited scaling capabilities and access control can be problematic. In V2X technologies, two vehicles apart from one another may use the same resource without incident as there are no denied access requests. V2X technologies also have advantages over 802.11p technologies as these V2X technologies are designed to meet latency requirements, even for moving vehicles, thus allowing for scheduling and access to resources in a timely manner.

In the instance of a blind curve scenario, road conditions may play an integral part in decision making opportunities for vehicles. V2X communications can provide for significant safety of operators where stopping distance estimations may be performed on a vehicle by vehicle basis. These stopping distance estimations allow for traffic to flow around courses, such as a blind curve, with greater vehicle safety, while maximizing the travel speed and efficiency.

Example Techniques for Side Link Communication Using Slot Aggregation

For sidelink communications as described with respect to FIG. 4, packet size may be large, but the amount of available bandwidth may be limited. In order to transmit a large packet, the transmission for side link communication may span multiple slots. The Uu interface (e.g., for uplink and downlink) has a transport block (TB) repetition scheme, which enables transmitting a packet over multiple slots. For example, a certain redundancy version (RV) of the TB (e.g., data to be encoded) is transmitted in one slot. However, NR TB repetition specifies that symbols assigned for data transmission in each of the slots are to be the same. Therefore, applying NR Uu TB repetition to sidelink communications is less feasible due to the variation of available resources for the sidelink communications. Moreover, the per-slot coding rate may be limited to smaller than 1 in NR. Therefore, although TB repetition may be used, large packets still may be unable to be transmitted in multiple slots with limited bandwidth due to the per-slot code rate limitation. Certain aspects of the present disclosure are generally directed to slot aggregation techniques that may be used for sidelink communications.

Figure 6:
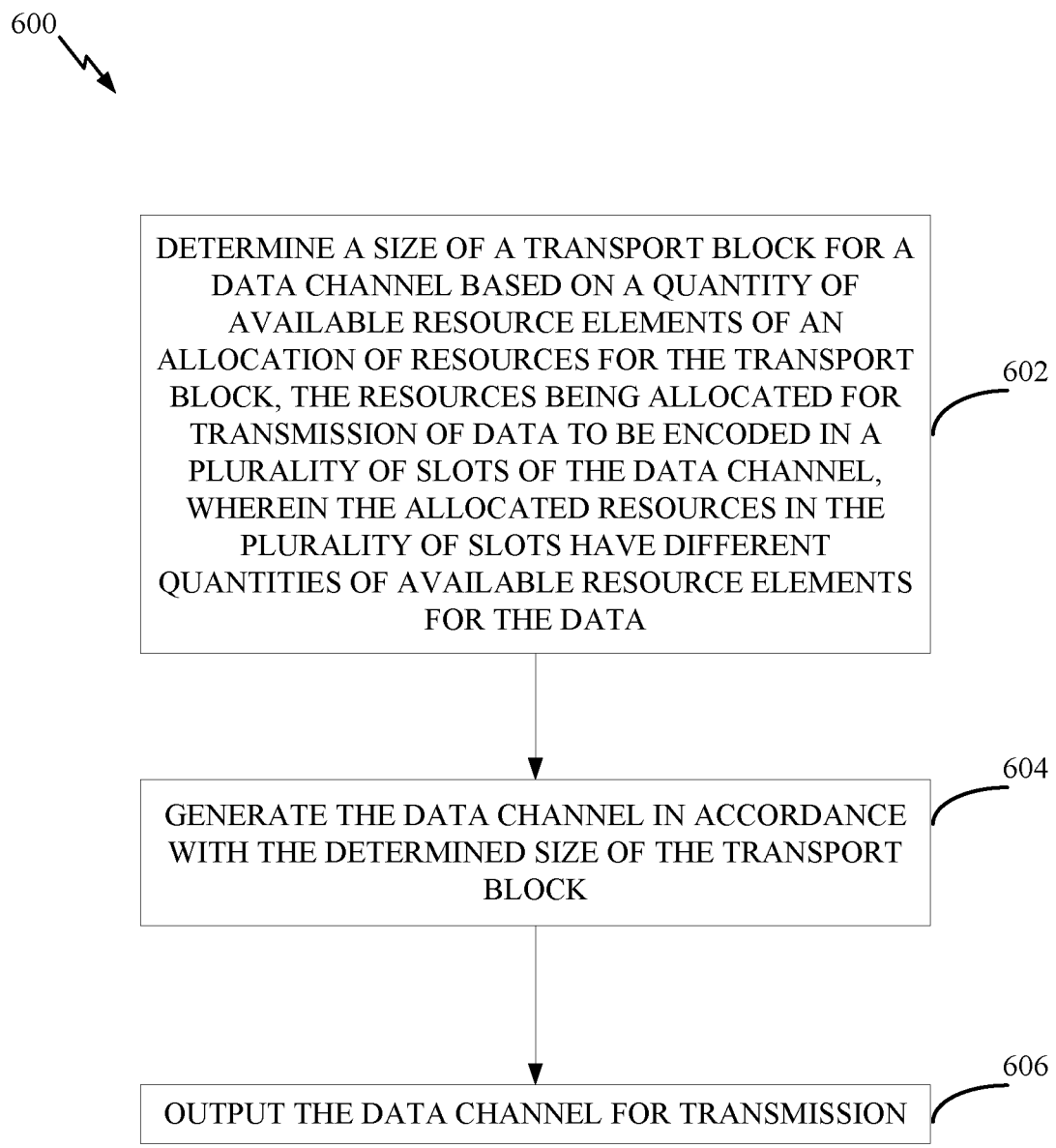
FIG. 6 illustrates example operations for wireless communication by a transmitter device, in accordance with certain aspects of the present disclosure.

FIG. 6 is a flow diagram illustrating example operations 600 for wireless communication, in accordance with certain aspects of the present disclosure. The operations 600 may be performed by a wireless node (transmitter device), such as a UE (e.g., a vehicle).

Operations 600 may be implemented as software components that are executed and run on one or more processors (e.g., controller/processor 280 of FIG. 2). Further, the transmission and reception of signals by the transmitter device in operations 600 may be enabled, for example, by one or more antennas (e.g., antennas 252 of FIG. 2). In certain aspects, the transmission and/or reception of signals by the transmitter device may be implemented via a bus interface of one or more processors (e.g., controller/processor 280) obtaining and/or outputting signals.

The operations 600 begin, at block 602, by determining a size of a transport block for a data channel based on a quantity of available resource elements (REs) of an allocation of resources for the transport block, the resources being allocated for transmission of data to be encoded in a plurality of slots of the data channel using slot aggregation. In certain aspects, the allocated resources in the plurality of slots may have different quantities of available REs for the data. At block 604, the transmitter device generates the data channel having the transport block in accordance with the determined size of the transport block, and, at block 606, outputs the data channel for transmission. A RE generally refers to a unit of resource in multi-carrier systems. For example a RE may refer to OFDM one sub-carrier during one OFDM symbol interval.

Figure 7:
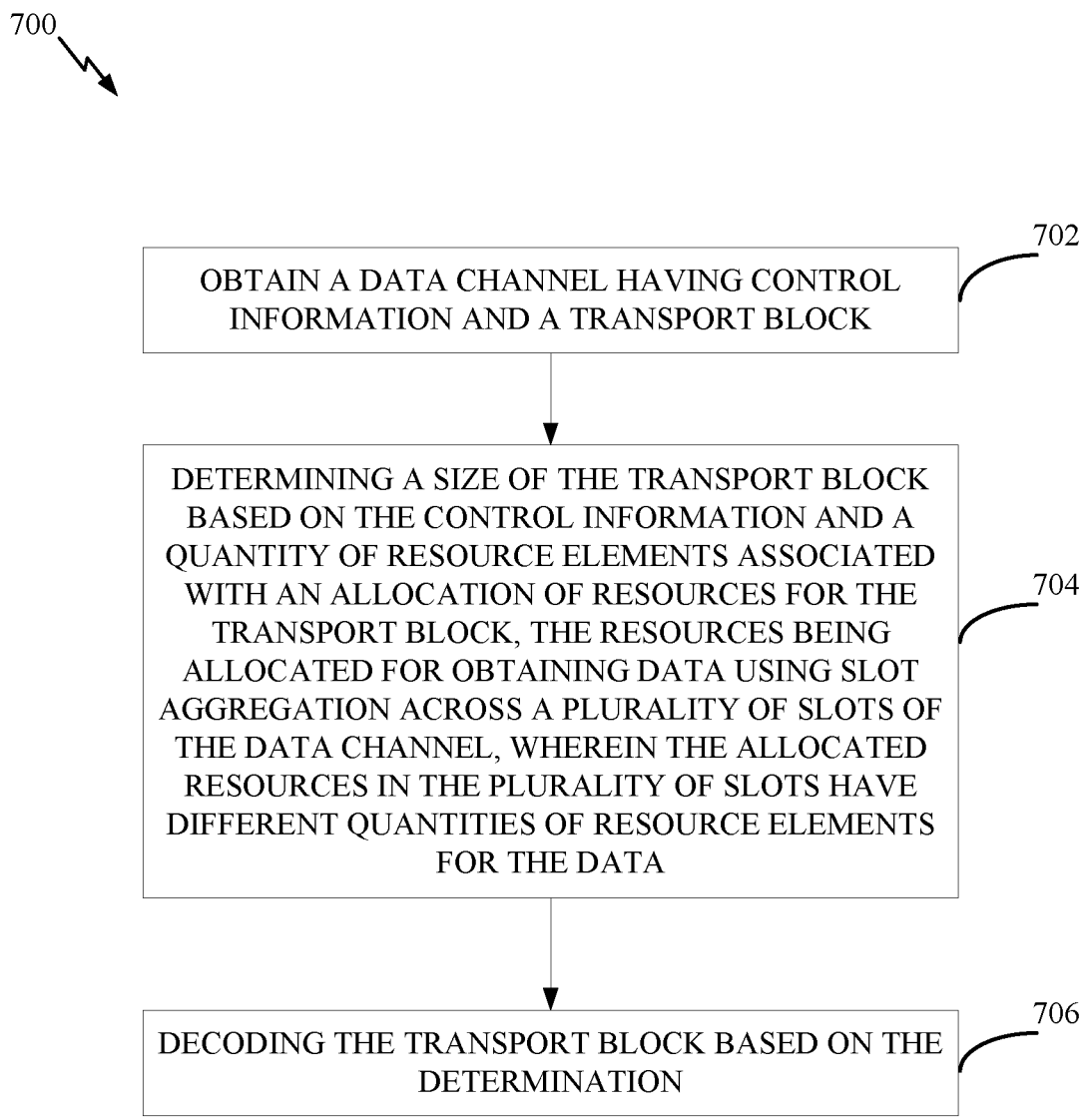
FIG. 7 illustrates example operations for wireless communication by a receiver device, in accordance with certain aspects of the present disclosure.

FIG. 7 is a flow diagram illustrating example operations 700 for wireless communication, in accordance with certain aspects of the present disclosure. The operations 600 may be performed by a wireless node (receiver device), such as a UE (e.g., a vehicle).

The operations 700 may be complimentary operations by a receiver device to the operations 600 performed by the transmitter device. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, at block 702, by obtaining a data channel having control information and a transport block. At block 704, the receiver device determines a size of the transport block based on the control information and a quantity of available REs of an allocation of resources for the transport block, the resources being allocated for obtaining data encoded in a plurality of slots of the data channel using slot aggregation, wherein the allocated resources in the plurality of slots have different quantities of available REs for the data, and at block 706, decodes the transport block in accordance with the determined size of the transport block.

Certain aspects of the present disclosure provide techniques for determining the quantity of REs associated with the allocated resources. For example, the allocated resources may include the plurality of slots in time, and one or multiple resource blocks (RBs) in frequency. Each of the RBs may include multiple REs, where the REs available for data transmission may be different across slots in the allocated resources, as described with respect to FIGS. 6 and 7. When the allocated resources include multiple RBs in frequency, the RBs may be non-contiguous in frequency.

In certain aspects, a transport block size (TBS) may be determined based on the number of REs and a modulation and coding scheme (MCS), such as a code rate, modulation order, and number of streams for the TB transmission. For example, there may be control information (e.g., also referred to herein as sidelink control information (SCI)) associated with the TB, e.g., which is sent in the first slot of the allocated resources. The SCI indicates at least the MCS (e.g., the modulation order and code rate of the transport block) used to generate one of more slots of the transport block. In certain aspects, the plurality of slots may be non-consecutive in time.

Figure 8:
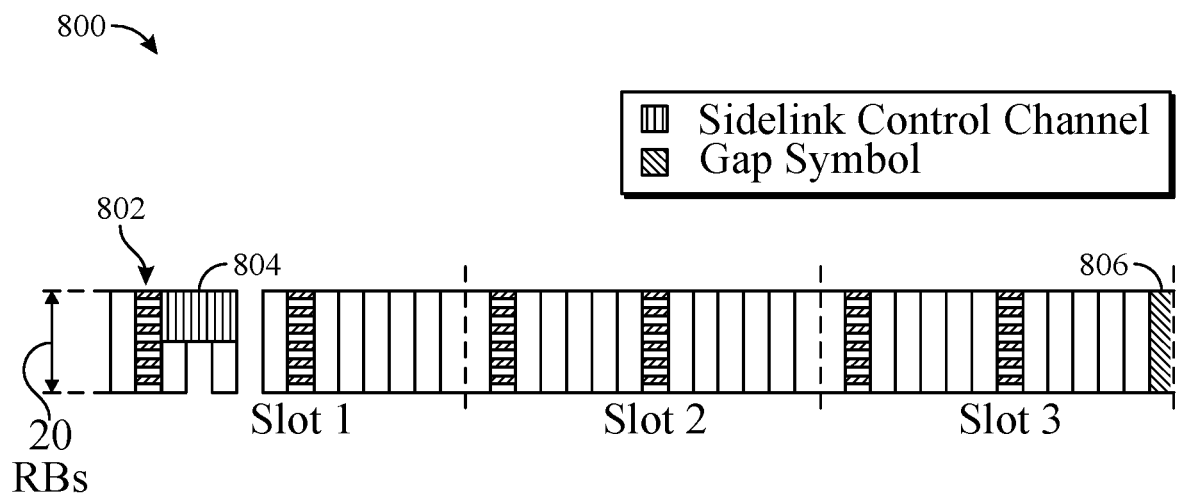
FIG. 8 illustrates multiple slots of allocated resources, in accordance with certain aspects of the present disclosure.

FIG. 8 illustrates multiple slots (e.g., slot 1, slot 2, and slot 3) of an allocation of resources 800, in accordance with certain aspects of the present disclosure. As illustrated, the allocated of resources 800 includes three slots and spans twenty RBs. As illustrated, some of the symbols (e.g., e.g., symbol 802) may assigned to transmit reference signals (e.g., demodulation reference signal (DMRS)). A portion of the allocation of resources 800 may be used to communicate the SCI 804, as illustrated. Moreover, the symbol 806 may be a gap symbol. These symbols may be excluded when determining the quantity of available resources elements associated with a transport block, as described in more detail herein. The locations and/or quantity of the symbols used for control information, gap symbols, and reference signals are provided to facilitate understanding and may be different in other implementations.

The TB may be segmented into multiple code blocks, each of the code blocks being encoded with at least a portion of the data for transmission. Rate matching may then be performed for transmission in each of the slots, based on the encoded code blocks and the redundancy version (RV) of the data to be encoded in each slot. For example, in allocation of resources 800, RV3 of the data may be encoded in slot 1, RV0 of the data may be encoded in slot 2, and RV2 of the data may be encoded in slot 3. Each of the RVs may include a different quantity of systematic bits, as opposed to parity bits that are used for error correction. Modulation operations may then be performed by the transmitter to generate modulated symbols, followed by transmission of the transport block including the modulated symbols.

Figure 9:
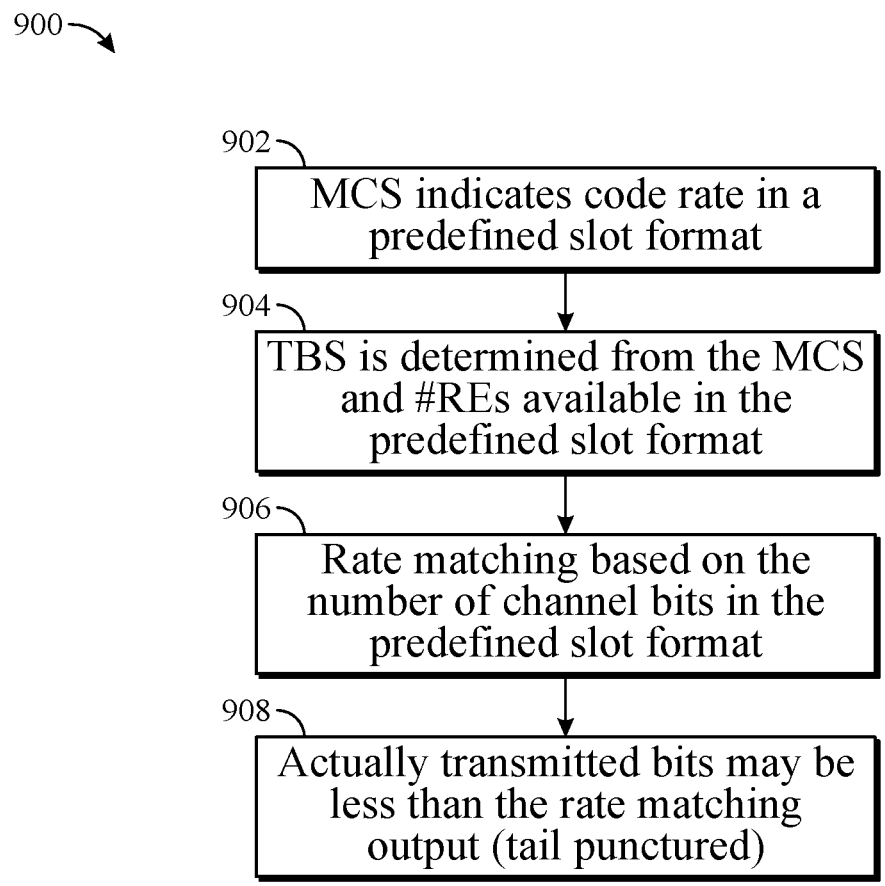
FIG. 9 illustrates example operations for slot aggregation using a configured slot format, in accordance with certain aspects of the present disclosure.

FIG. 9 illustrates example operations 900 for slot aggregation using a configured slot format (e.g., predefined or preconfigured slot format), in accordance with certain aspects of the present disclosure. For example, the operations 900 provide techniques for processing a TB for slot aggregation using a configured slot format as illustrated in FIG. 10.

Figure 10:
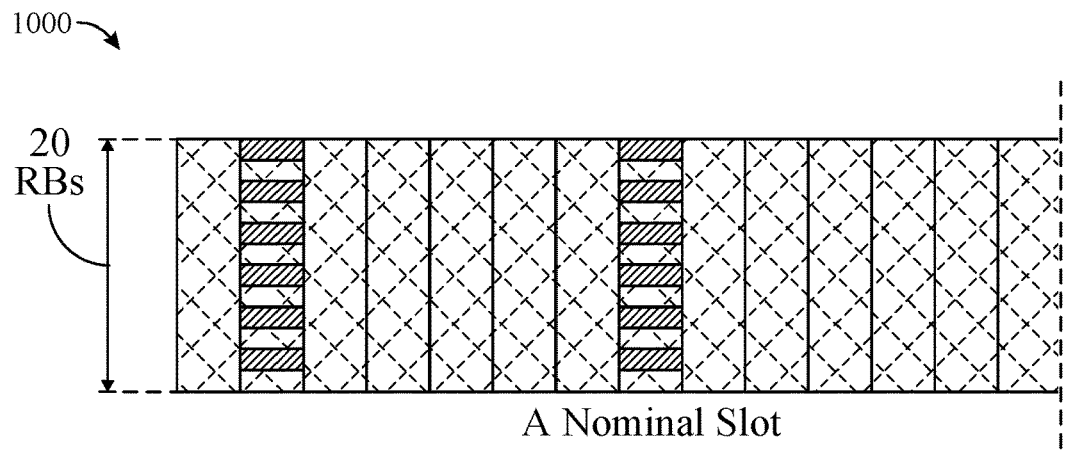
FIG. 10 illustrates an example configured slot format, in accordance with certain aspects of the present disclosure.

FIG. 10 illustrates an example configured slot format 1000, in accordance with certain aspects of the present disclosure. The configured slot format may be a preconfigured slot format known by both the transmitter and receiver to facilitate encoding and decoding of the transport block. For example, an MCS may be indicated in a channel (e.g., via the SCI 804), and the MCS may indicate the code rate corresponding to the configured slot format 1000, as described in block 902 of FIG. 9. In other words, the code rate indicated via the SCI 804 may indicate the code rate in the configured slot format 1000. Therefore, the actual MCS of the slots may be different than the indicated MCS via the SCI 804 because the actual available REs may be different than the resources in the preconfigured slot format.

A described in block 904, the transmitter (and receiver) may determine the TBS based on the MCS and a quantity of REs available in the configured slot format. In certain aspects, the quantity of REs may be determined from allocated resources. For example, the quantity of REs may be determined based on the bandwidth of the allocated resources and the number of reference signals (e.g., DMRS) to be used for the TB transmission, with respect to the configured slot format. That is, for a configured slot format, the number of symbols may be predefined. The number of REs per RB may be determined from the number of symbols, excluding REs occupied by DMRS. Moreover, the total REs available in a configured slot may be represented by the bandwidth (e.g., number of RBs) times the number of REs per RB.

The configured slot format at least indicates the number of symbols in the slot. As described in block 906, the transmitter may perform rate matching based on the number of channel bits in the configured slot format.

Rate matching may be performed for each slot based on a RV to be used for the TB transmission in the slot, and the number of channel bits that may be transmitted in a configured slot format. In certain aspects, REs occupied by control information (e.g., control channel) and gap symbols may be precluded when performing the rate matching, and therefore, fewer bits may be transmitted in a slot if there is resource occupation by control information and gap symbols. The length of the rate matching output bits ($E_r$) may be different from the actual available channel bits in the slot ($E'_{r,1}$). For example, $E'_{r,1}$ may be less than $E_r$, 1 being the slot index. In some cases, only a portion of $E'_{r,1}$ bits of the sequence from rate matching may be transmitted in the slot 1, the remaining portions being punctured as described in more detail with respect to FIG. 11.

Figure 11:
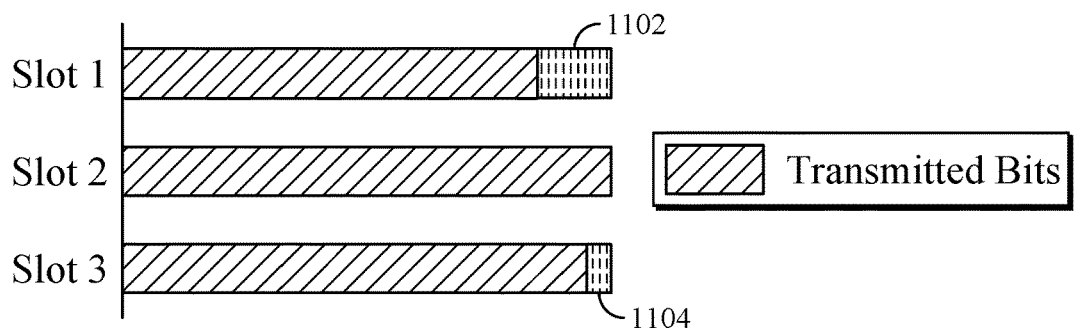
FIG. 11 illustrates bits for transmission in multiple slots, in accordance with certain aspects of the present disclosure.

FIG. 11 illustrates bits for transmission in multiple slots, in accordance with certain aspects of the present disclosure. As illustrated, slots 1 and 3 may have portions 1102, 1104 that are punctured. In other words, bits in the tail end of slots 1 and 3 are not transmitted. Therefore, the bit length after rate matching for each slot may be different. In certain aspects, the RV to be used in the slots of the allocated resources for the TB transmission may be based on a configured (e.g., preconfigured or predefined) RV order. For example, the RV order may be configured such that the slot with most REs available is encoded based on an RV of data with the most systematic bits (e.g. RV0 in NR). In other words, due to the puncturing of slot 1, the RV having the most systematic bits (e.g., as opposed parity bits for error correction) may not be assigned to slot 1. For example, as illustrated in FIG. 8, RV3 (e.g. having the fewest systematic bits) may be assigned to slot 1 which has the fewest available REs and RV0 (e.g., having the most systematic bits) may be assigned to slot 2 having the most available REs. As described in block 908, in the case of operations 900, the transmitted bits may be less than the rate matching output, due to the puncturing of tail ends of some slots.

Figure 12:
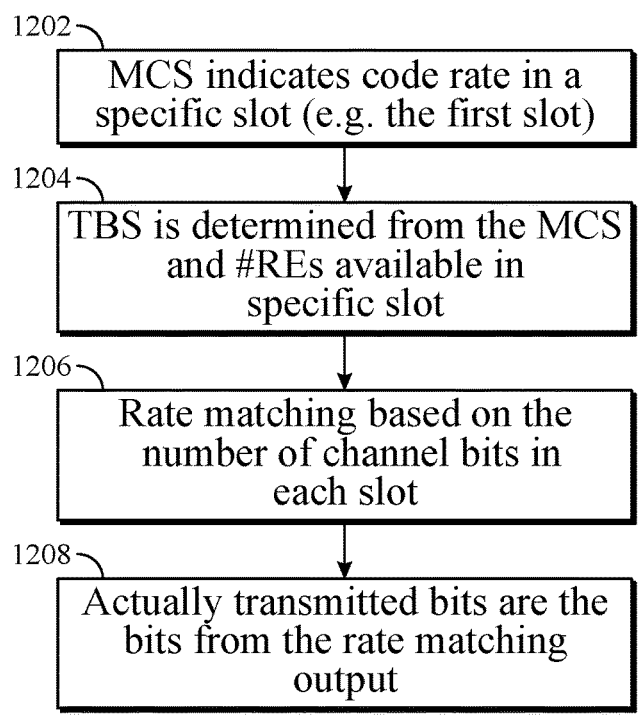
FIG. 12 illustrates example operations for wireless communication using an modulation and coding scheme (MCS) indication of a specific slot, in accordance with certain aspects of the present disclosure.

FIG. 12 illustrates example operations 1200 for wireless communication using an MCS indication of a specific slot (e.g., first slot), in accordance with certain aspects of the present disclosure. In other words, as described in block 1202, there may be control information associated with the transport block (e.g., the control information may be sent in the first slot of the aggregated slots) indicating the MCS (e.g., code rate) in a specific slot of the transmission of the TB, such as the first slot illustrated in FIG. 13.

Figure 13:
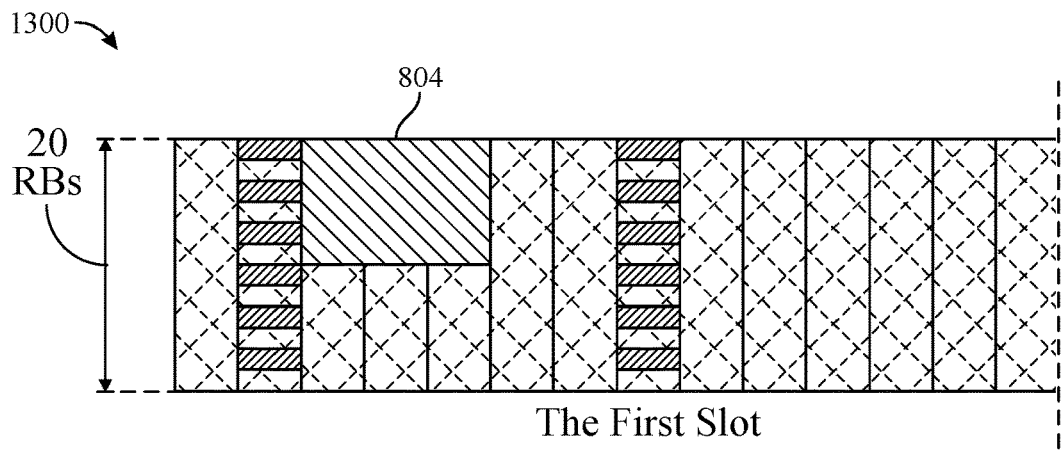
FIG. 13 illustrates a format of a specific slot of allocated resources for slot aggregation, in accordance with certain aspects of the present disclosure.

FIG. 13 illustrates a format of a specific slot (e.g., first slot) 1300 of allocated resources for slot aggregation, in accordance with certain aspects of the present disclosure. As illustrated, the slot 1300 includes SCI 804, as described herein. The code rate indicated via the SCI 804 indicates the code rate in the slot 1300 of the allocated resources. For example, the SCI may indicate the MCS corresponding to the first slot (slot 1). Thus, the code rate may be equal to the TBS divided by the number of channel bits in the slot 1300 (e.g., first slot).

The TBS is then determined, as described at block 1204, from the MCS and the number of REs available in the specific slot. In certain aspects, the number of available REs may be determined from allocated resources. For example, the number of REs may be the number of REs available in the specific slot (e.g., first slot) of the allocated resources, excluding REs used for control information (e.g., control channel), reference signals (e.g., such as symbol 802), and/or gap symbols (e.g., such as symbol 806), in that slot. The reference signals may be any of various reference signals such as DMRS, channel state information (CSI)-RS, sounding reference signal (SRS), RS for noise tracking, and RS for automatic gain control (AGC) training. The gap symbols may be one or more symbols that are not available for data transmission and/or reception such as symbols used for AGC training, sidelink feedback transmission, and/or Tx/Rx turnaround time.

As described at block 1206, the transmitter may perform rate matching based on the number of channel bits (e.g., modulation order times quantity of REs) in each slot. Therefore, the actual coding rate may be slightly different across the slots. For example, rate matching may be performed for each slot based on a RV of the data to be used for the TB transmission in the slot, and the number of channel bits available for transmission in the slot. The number of channel bits may be the product of number of available REs in the slot and the modulation order associated with the slot. For instance, the length of the bit sequence from the rate matching may be the same as the number of channel bits of the slot. In other words, as described at block 1208, in the case of operations 1200, the transmitted bits may be the same as the output of the rate matching operation since the rate matching is performed based on the number of channel bits in each slot. The rate matching in slots 2 and 3 may be performed based on actual available REs, as described in more detail herein.

Figure 14:
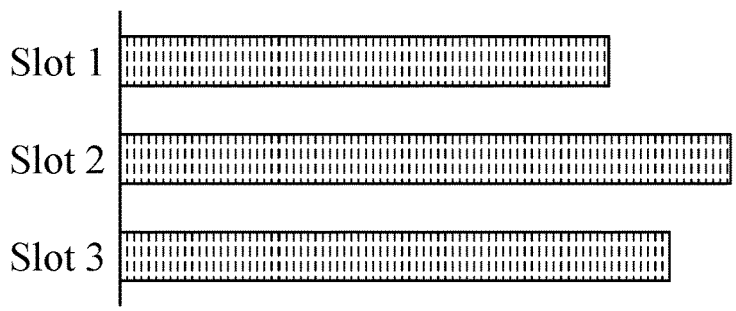
FIG. 14 illustrates available resource elements in each of multiple slots, in accordance with certain aspects of the present disclosure.

FIG. 14 illustrates available REs in each of multiple slots, in accordance with certain aspects of the present disclosure. As illustrated, the length of the bit sequence in each of the slots may be different after rate matching since rate matching is performed based on the actual available REs of each slot. The receiver of the TB may correctly combine the data cross slots for hybrid automatic repeat request (HARQ) repetition if the transmitter and receiver have the same understanding as to the frame structure (e.g., frame structure of slot 1 for which the MCS is indicated).

Determining the RV to be used in the slots of allocated resources for the TB transmission may be at least based on the quantity of available REs in each of the slots. For example, the RV may be determined such that, the slot with most REs available has a RV with most systematic bits, as described herein. In this example, UEs determine the RV independently without network assistance.

Figure 15:
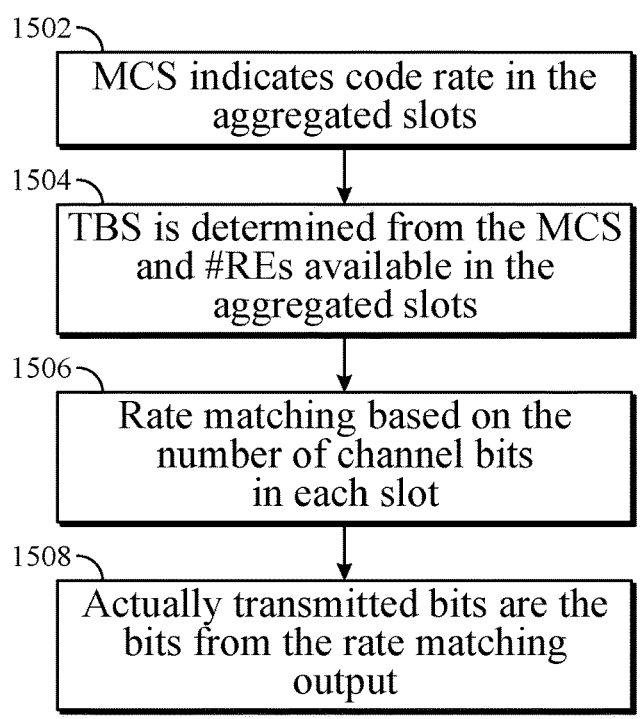
FIG. 15 illustrates example operations for wireless communication using an MCS indication of aggregated slots, in accordance with certain aspects of the present disclosure.

FIG. 15 illustrates example operations 1500 for wireless communication using an MCS indication of aggregated slots, in accordance with certain aspects of the present disclosure. In other words, as described at block 1502, there may be control information (e.g., SCI 804) associated with the TB transmission indicating the MCS (e.g., an aggregate code rate of multiple slots) corresponding to the multiple slots being used for slot aggregation. For example, the SCI may indicate the code rate of the transmission of the TB in the allocated resources (e.g., as opposed to a specific slot of the allocated resources). For example, the code rate may be equal to the TBS divided by the total number of channel bits in the allocated resource. Moreover, the number of total channel bits may be defined as the product of the modulation order and the number of total available REs.

The TBS is then determined, as described at block 1504, from the MCS and the number of REs available in the aggregated slots. For example, the TBS may be determined based on the code rate, modulation order indicated by the SCI 804, the number of streams for the TB transmission, and the available REs in the allocated resources (e.g., aggregated slots 1, 2, and 3). In other words, the MCS and TBS may be determined as if the packet including the allocated resources is transmitted once in the aggregated slots.

In certain aspects, the number of available REs may be determined from the allocated resources. For example, the number of available REs may be the total number of REs available in the allocated resources, excluding REs used for control information (e.g., control channel), reference signals, and gap symbols, as described herein.

As described at block 1506, the transmitter may perform rate matching based on the number of channel bits (or REs) in each slot. For example, rate matching may be performed for each slot based on a RV of the data to be used for the TB transmission in the slot, and the number of channel bits available for transmission in the slot. The RV of data encoded in each slot may be different. The number of channel bits may be the product of the number of available REs in the slot and the modulation order associated with the slot. For instance, the length of the bit sequence from the rate matching may be the same as the number of channel bits of the slot. In other words, as described at block 1508, in the case of operations 1500, the transmitted bits may be the same as the output of the rate matching operation since the rate matching is performed based on the number of channel bits in each slot. Determining the RV to be used in the slots of allocated resources for the TB transmission may be at least based on the number of available REs in each of the slots. The RV may be determined such that the slot with most REs available has a RV with most (e.g., highest quantity) systematic bits, as described herein.

When the code rate indicates the code rate in one of the slots in the allocated resources (e.g., as described with respect to operations 1200), or code rate in the configured slot format (e.g., as described with respect to operations 900), the code rate may be larger than 1. The receiver device may still be able to decode the TB after combining the transmission in aggregated slots. In other words, the effective code rate in the plurality of slots may be less than 1. Still, when the MCS indicates code rate in one of the slots, or code rate in the configured slot format, MCS table with code rate(s) larger than 1 may be used.

In certain aspects, the rate matched code blocks (CBs) may be concatenated in a different order in different slots of the allocated resources. For example, the TB may be segmented into two CBs. In a first slot, the order of CBs may be {CB0, CB1} and in a second slot, the order of CBs may be {CB1, CB0}. Since, some of the bits in the last CB may not get transmitted (punctured) when a slot has less REs available, using different orders of the CBs results in the puncturing to impact different CBs in the different slots. In other words, losing one CB at the receiver (e.g., due to puncturing) may have less of an impact since the CB may be recovered in other slots in which the CB is not punctured.

In certain aspects, the RBs in the granted resources may be contiguous, or non-contiguous. For example, one or more RBs between the allocated RBs may be used by other devices or purposes. Moreover, the slots in the allocated resources may be consecutive or non-consecutive in time. For example, one or more slots between the allocated slots may be used by other devices or purposes. One benefit of using non-consecutive slots/non-contiguous RBs is to allow for time/frequency diversity gain. Certain aspects described herein allow for the transmission of larger packets over multiple slots, even with limited bandwidth.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

Figure 6A:
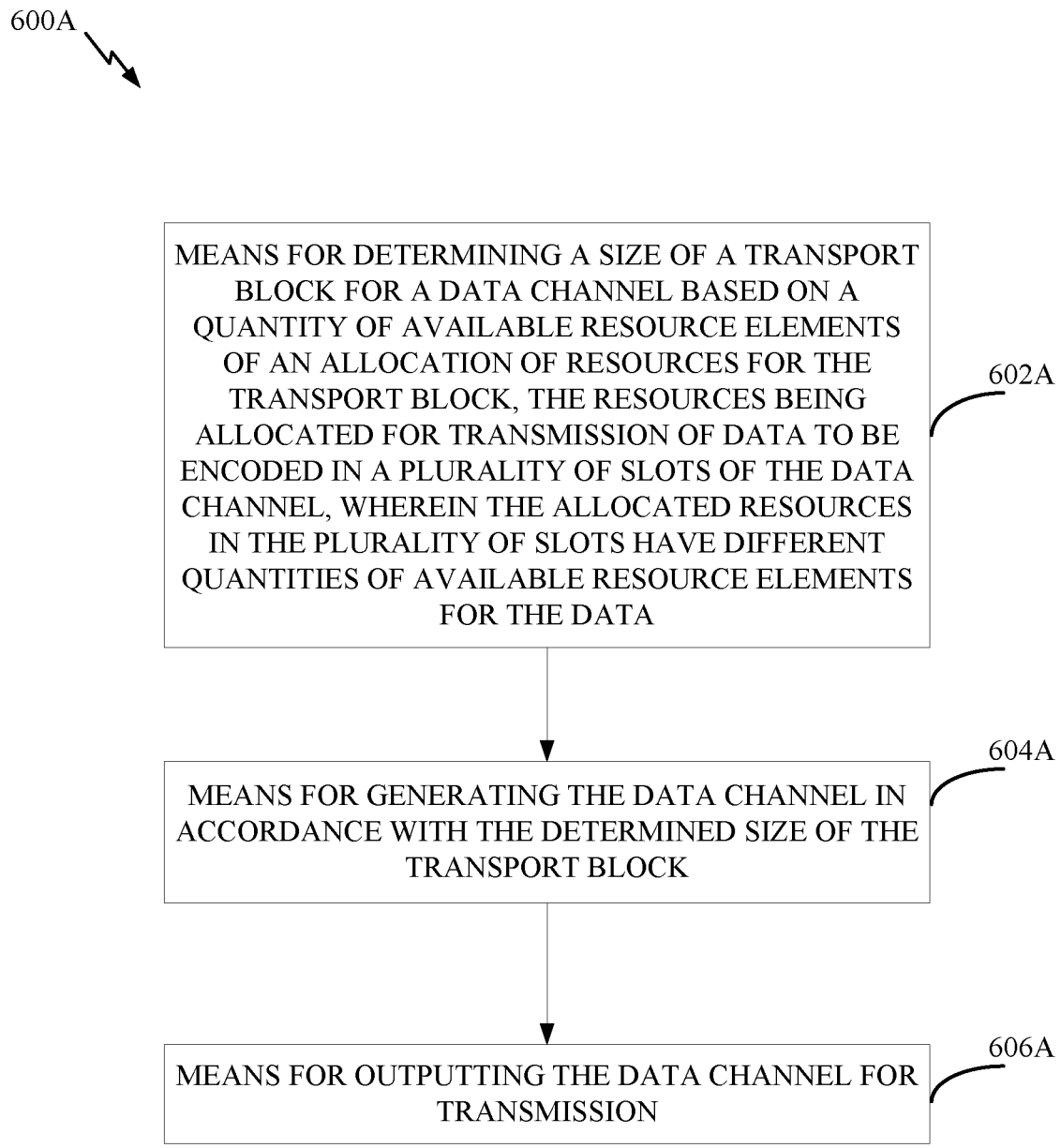
FIG. 6A illustrates example components capable of performing the operations shown in FIG. 6.
Figure 7A:
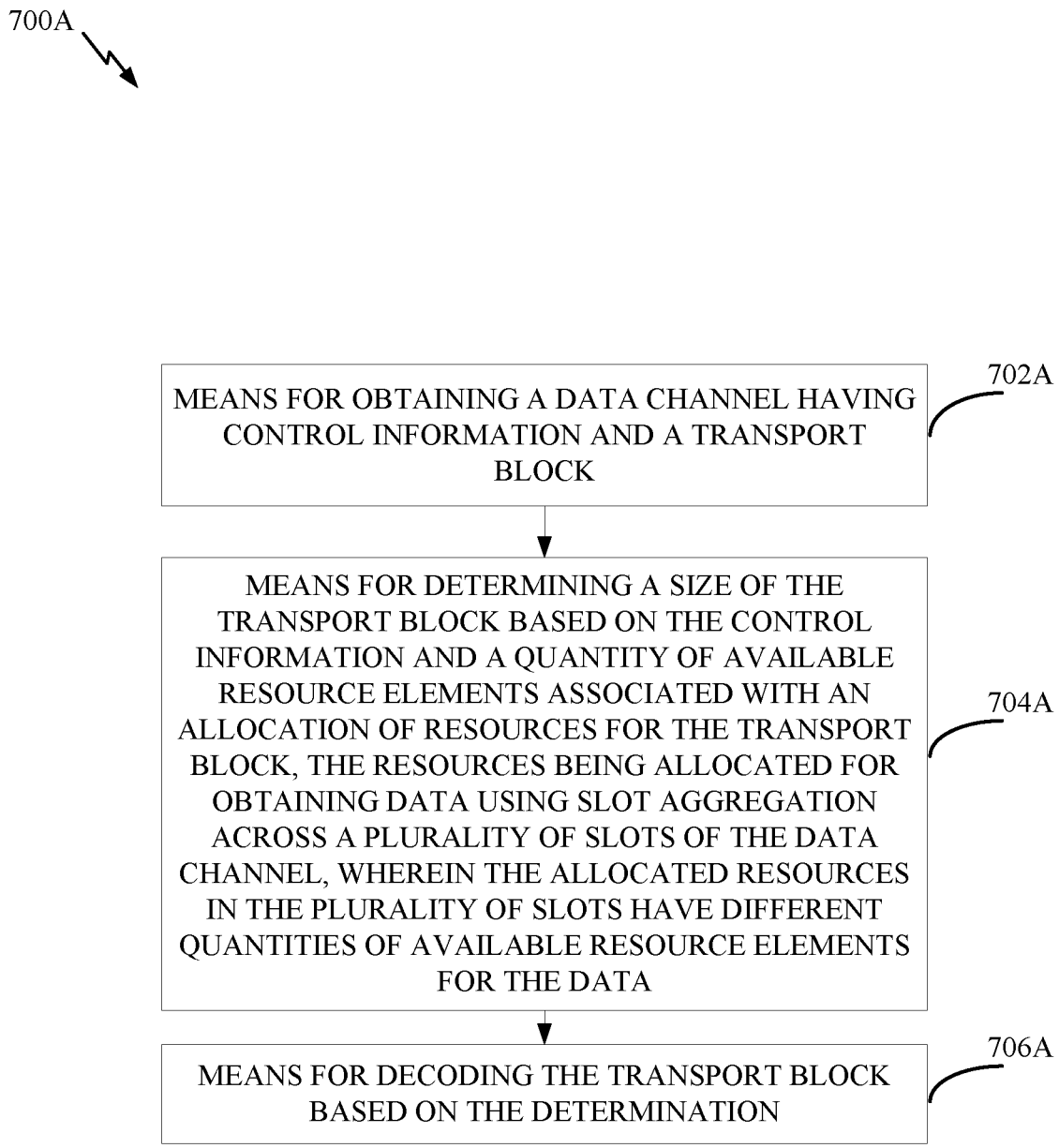
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 and 700 illustrated in FIGS. 6 and 7 correspond to means 600A illustrated in FIG. 6A and means 700A illustrated in FIG. 7A, respectively. In certain aspects, means for transmitting (or means for outputting for transmission) may include a transmitter such as the transmit processor 264 and/or an antenna(s) 252. Means for receiving (or means for obtaining) may include a receiver such as the receive processor 258 and/or an antenna(s) 254. Means for processing, means for decoding, means for determining, means for selecting, means for obtaining, means for generating may include a processing system, which may include one or more processors, such as the controller/processor 280.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception. In some cases, the interface to output a frame for transmission and the interface to obtain a frame (which may be referred to as first and second interfaces herein) may be the same interface.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The processing system may include one or more processors. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, comprising:
   a memory comprising instructions;
   a processing system configured to execute the instructions and cause the apparatus to:
      determine a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data;
      select a redundancy version of a plurality of redundancy versions of the data to be encoded in a slot of the plurality of slots based at least on a quantity of resource elements associated with the slot, wherein the selected redundancy version has the most systematic bits of the plurality of redundancy versions and is associated with the slot having the highest quantity of resource elements of the plurality of slots;
      generate the transport block comprising generating the plurality of slots by encoding the transport block in each slot using the redundancy version of the data for the respective slot; and
      generate the data channel in accordance with the determined size of the transport block; and
   an interface configured to output the data channel for transmission.

2. The apparatus of claim 1, wherein:
   the generating of the transport block is further based on a modulation and coding scheme (MCS) associated with the transport block, a slot of the plurality of slots comprises control information indicating one or more parameters associated with the MCS, and the one or more parameters comprise: a modulation order associated with the transport block; an aggregate code rate associated with the transport block in the plurality of slots; a code rate associated with the transport block in a slot of the plurality of slots; or a code rate associated with the transport block in resources in a configured slot format associated with the plurality of slots.

3. The apparatus of claim 1, wherein the processing system is further configured to determine the size of the transport block based on at least one of code rate, modulation order, or number of spatial streams associated with the transport block.

4. The apparatus of claim 1, wherein the quantity of available resource elements comprises:
a total quantity of resource elements of the allocated resources excluding resource elements allocated for transmission of at least one of control information, reference signals, or gap symbol,
(ii) a quantity of resource elements in a slot of the plurality of slots excluding resource elements of the slot allocated for transmission of at least one of control information, reference signals, or gap symbols, or
(iii) a quantity of resource elements in a configured slot format, wherein a bandwidth of the configured slot format is the same as a bandwidth of the allocated resources excluding resources allocated for reference signals.

5. The apparatus of claim 1, wherein the generating of the transport block comprises performing rate matching for each slot of the plurality of slots based on a respective redundancy version of a plurality of redundancy versions associated with the respective slot, wherein the rate matching is performed further based on a quantity of channel bits of the respective slot, or a quantity of channel bits of a configured slot format associated with the plurality of slots.

6. An apparatus for wireless communication, comprising:
a memory comprising instructions;
a processing system configured to execute the instructions and cause the apparatus to:
determine a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data;
select a redundancy version of a plurality of redundancy versions of the data to be encoded in a slot of the plurality of slots based on a configured redundancy version order, wherein the selected redundancy version has the most systematic bits of the plurality of redundancy versions and is associated with the slot having the highest quantity of available resource elements of the plurality of slots;
generate the transport block comprising generating the plurality of slots by encoding the transport block in each slot using the redundancy version of the data for the slot; and
generate the data channel in accordance with the determined size of the transport block; and
an interface configured to output the data channel for transmission.

7. The apparatus of claim 1, wherein:
the data in each of the plurality of slots is associated with a plurality of code blocks; and
the generating of the transport block comprises encoding the transport block in at least two of the plurality of slots with different orders of the plurality of code blocks.

8. The apparatus of claim 6, wherein:
the generating of the transport block is further based on a modulation and coding scheme (MCS) associated with the transport block,
a slot of the plurality of slots comprises control information indicating one or more parameters associated with the MCS,
the one or more parameters comprise: a modulation order associated with the transport block; an aggregate code rate associated with the transport block in the plurality of slots; a code rate associated with the transport block in a slot of the plurality of slots; or a code rate associated with the transport block in resources in a configured slot format associated with the plurality of slots.

9. The apparatus of claim 6, wherein the processing system is further configured to determine the size of the transport block based on at least one of code rate, modulation order, or number of spatial streams associated with the transport block.

10. The apparatus of claim 6, wherein the quantity of available resource elements comprises:
(i) a total quantity of resource elements of the allocated resources excluding resource elements allocated for transmission of at least one of control information, reference signals, or gap symbols,
(ii) a quantity of resource elements in a slot of the plurality of slots excluding resource elements of the slot allocated for transmission of at least one of control information, reference signals, or gap symbols, or
(iii) a quantity of resource elements in a configured slot format, wherein a bandwidth of the configured slot format is the same as a bandwidth of the allocated resources excluding resources allocated for reference signals.

11. The apparatus of claim 6, wherein the generating of the transport block comprises performing rate matching for each slot of the plurality of slots based on a respective redundancy version of a plurality of redundancy versions associated with the respective slot, wherein the rate matching is performed further based on a quantity of channel bits of the respective slot, or a quantity of channel bits of a configured slot format associated with the plurality of slots.

12. The apparatus of claim 6, wherein:
the data in each of the plurality of slots is associated with a plurality of code blocks; and
the generating of the transport block comprises encoding the transport block in at least two of the plurality of slots with different orders of the plurality of code blocks.

13. An apparatus for wireless communication, comprising:
an interface configured to obtain a data channel having control information and a transport block;
a memory comprising instructions; and
a processing system configured to execute the instructions and cause the apparatus to:
determine a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data;
- select a redundancy version of a plurality of redundancy versions of the data encoded in each slot of the plurality of slots based at least on a quantity of resource elements associated with the slot, wherein the selected redundancy version has the most systematic bits of the plurality of redundancy versions and is associated with the slot having the highest quantity of resource elements of the plurality of slots; and
- decode the transport block in accordance with the determined size of the transport block, the decoding of the transport block comprises decoding the transport block in each slot using the redundancy version of the data for the respective slot.

14. The apparatus of claim 13, wherein:
- a slot of the plurality of slots comprises the control information, the control information indicating one or more parameters associated with a modulation and coding scheme (MCS),
- the processing system is further configured to decode the transport block based on the one or more parameters, and
- the one or more parameters comprise an aggregate code rate associated with the transport block in the plurality of slots, a code rate associated with the transport block in a slot of the plurality of slots, or a code rate associated with the transport block in resources in a configured slot format associated with the plurality of slots.

15. The apparatus of claim 13, wherein the processing system is further configured to determine the size of the transport block based on at least one of code rate, modulation order, or number of spatial streams associated with the transport block.

16. The apparatus of claim 13, wherein the quantity of available resource elements comprises:
- (i) a total quantity of resource elements of the allocated resources excluding resource elements allocated for transmission of at least one of control information, reference signals, or gap symbols,
- (ii) a quantity of resource elements in a slot of the plurality of slots of the transport block excluding resource elements of the slot allocated for transmission of at least one of a control information, reference signals, or gap symbols, or
- (iii) a quantity of resource elements in a configured slot format, wherein a bandwidth of the configured slot format is the same as a bandwidth of the allocated resources excluding resources allocated for reference signals.

17. The apparatus of claim 13, wherein the data in each of the plurality of slots is associated with a plurality of code blocks, at least two of the plurality of slots having different orders of the plurality of code blocks.

18. An apparatus for wireless communication, comprising:
- an interface configured to obtain a data channel having control information and a transport block;
- a memory comprising instructions; and
- a processing system configured to execute the instructions and cause the apparatus to:
  - determine a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data;
  - select a redundancy version of a plurality of redundancy versions of the data encoded in each slot of the plurality of slots based on a configured redundancy version order, wherein the selected redundancy version has the most systematic bits of the plurality of redundancy versions and is associated with the slot having the highest quantity of available resource elements of the plurality of slots; and
  - decode the transport block in accordance with the determined size of the transport block, wherein the decoding of the transport block comprises decoding the transport block in each slot using the redundancy version of the data for the slot.

19. The apparatus of claim 18, wherein:
- a slot of the plurality of slots comprises the control information, the control information indicating one or more parameters associated with a modulation and coding scheme (MCS),
- the processing system is further configured to decode the transport block based on the one or more parameters, and
- the one or more parameters comprise an aggregate code rate associated with the transport block in the plurality of slots, a code rate associated with the transport block in a slot of the plurality of slots, or a code rate associated with the transport block in resources in a configured slot format associated with the plurality of slots.

20. The apparatus of claim 18, wherein the processing system is further configured to determine the size of the transport block based on at least one of code rate, modulation order, or number of spatial streams associated with the transport block.

21. The apparatus of claim 18, wherein the quantity of available resource elements comprises:
- (i) a total quantity of resource elements of the allocated resources excluding resource elements allocated for transmission of at least one of control information, reference signals, or gap symbols,
- (ii) a quantity of resource elements in a slot of the plurality of slots of the transport block excluding resource elements of the slot allocated for transmission of at least one of a control information, reference signals, or gap symbols, or
- (iii) a quantity of resource elements in a configured slot format, wherein a bandwidth of the configured slot format is the same as a bandwidth of the allocated resources excluding resources allocated for reference signals.

22. The apparatus of claim 18, wherein the data in each of the plurality of slots is associated with a plurality of code blocks, at least two of the plurality of slots having different orders of the plurality of code blocks.

23. A method for wireless communication, comprising:
- determining a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data;

selecting a redundancy version of a plurality of redundancy versions of the data to be encoded in a slot of the plurality of slots based at least on a quantity of resource elements associated with the slot, wherein the selected redundancy version has the most systematic bits of the plurality of redundancy versions and is associated with the slot having the highest quantity of resource elements of the plurality of slots;

generating the transport block comprising generating the plurality of slots by encoding the transport block in each slot using the redundancy version of the data for the respective slot;

generating the data channel in accordance with the determined size of the transport block; and outputting the data channel for transmission.

24. The method of claim 23, wherein the quantity of available resource elements comprises:
(i) a total quantity of resource elements of the allocated resources excluding resource elements allocated for transmission of at least one of control information, reference signals, or gap symbols,
(ii) a quantity of resource elements in a slot of the plurality of slots excluding resource elements of the slot allocated for transmission of at least one of control information, reference signals, or gap symbols, or
(iii) a quantity of resource elements in a configured slot format, wherein a bandwidth of the configured slot format is the same as a bandwidth of the allocated resources excluding resources allocated for reference signals.

25. A method for wireless communication, comprising:
obtaining a data channel having control information and a transport block;
determining a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data;
selecting a redundancy version of a plurality of redundancy versions of the data encoded in each slot of the plurality of slots based at least on a quantity of resource elements associated with the slot, wherein the selected redundancy version has the most systematic bits of the plurality of redundancy versions and is associated with the slot having the highest quantity of resource elements of the plurality of slots; and
decoding the transport block in accordance with the determined size of the transport block, the decoding of the transport block comprises decoding the transport block in each slot using the redundancy version of the data for the respective slot.

26. The method of claim 25, wherein:
a slot of the plurality of slots comprises the control information, the control information indicating one or more parameters associated with a modulation and coding scheme (MCS), and the transport block is decoded based on the one or more parameters, wherein the one or more parameters comprise an aggregate code rate associated with the transport block in the plurality of slots, a code rate associated with the transport block in a slot of the plurality of slots, or a code rate associated with the transport block in resources in a configured slot format associated with the plurality of slots.

27. A method for wireless communication, comprising:
determining a size of a transport block for a data channel based on a quantity of available resource elements of an allocation of resources for the transport block, the resources being allocated for transmission of data to be encoded in a plurality of slots of the data channel using slot aggregation, wherein the allocated resources in the plurality of slots have different quantities of available resource elements for the data;
selecting a redundancy version of a plurality of redundancy versions of the data to be encoded in a slot of the plurality of slots based on a configured redundancy version order, wherein the selected redundancy version has the most systematic bits of the plurality of redundancy versions and is associated with the slot having the highest quantity of available resource elements of the plurality of slots;
generating the transport block, wherein the generating of the transport block comprises generating the plurality of slots by encoding the transport block in each slot using the redundancy version of the data for the slot;
generating the data channel in accordance with the determined size of the transport block; and
outputting the data channel for transmission.

28. The method of claim 27, wherein the quantity of available resource elements comprises:
(i) a total quantity of resource elements of the allocated resources excluding resource elements allocated for transmission of at least one of control information, reference signals, or gap symbols,
(ii) a quantity of resource elements in a slot of the plurality of slots excluding resource elements of the slot allocated for transmission of at least one of control information, reference signals, or gap symbols, or
(iii) a quantity of resource elements in a configured slot format, wherein a bandwidth of the configured slot format is the same as a bandwidth of the allocated resources excluding resources allocated for reference signals.

29. A method for wireless communication, comprising:
obtaining a data channel having control information and a transport block;
determining a size of the transport block based on the control information and a quantity of available resource elements of an allocation of resources for the transport block, the resources being allocated for obtaining data encoded in a plurality of slots of the data channel using slot aggregation, wherein the allocated resources in the plurality of slots have different quantities of available resource elements for the data;
selecting a redundancy version of a plurality of redundancy versions of the data encoded in each slot of the plurality of slots based on a configured redundancy version order, wherein the selected redundancy version has the most systematic bits of the plurality of redundancy versions and is associated with the slot having the highest quantity of available resource elements of the plurality of slots; and
decoding the transport block in accordance with the determined size of the transport block, the decoding of the transport block comprises decoding the transport block in each slot using the redundancy version of the data for the slot.

30. The method of claim 29, wherein:
a slot of the plurality of slots comprises the control information, the control information indicating one or more parameters associated with a modulation and coding scheme (MCS), and
the transport block is decoded based on the one or more parameters, wherein the one or more parameters comprise an aggregate code rate associated with the transport block in the plurality of slots, a code rate associated with the transport block in a slot of the plurality of slots, or a code rate associated with the transport block in resources in a configured slot format associated with the plurality of slots.

\* \* \* \* \*